US012755201B1

(12) United States Patent
Wolff et al.

(10) Patent No.: US 12,755,201 B1
(45) Date of Patent: Oct. 6, 2026

(54) TRAINING MACHINE LEARNING MODELS USING PRIVACY PRESERVING FAIRNESS REGULARIZATION

(71) Applicant: Amazon Technologies, Inc., Seattle, WA (US)

(72) Inventors: Ran Wolff, Geva Carmel (IL); Morgan Dumitru, London (GB)

(73) Assignee: Amazon Technologies, Inc., Seattle, WA (US)

(*) Notice: Subject to any disclaimer, the term of this patent is extended or adjusted under 35 U.S.C. 154(b) by 693 days.

(21) Appl. No.: 18/196,158

(22) Filed: May 11, 2023

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
USPC ........................................................... 706/12
See application file for complete search history.

(56) References Cited

U.S. PATENT DOCUMENTS 8,620,838 B1 * 12/2013 Moore ................... G06N 20/00 706/12
12,002,258 B2 * 6/2024 Miroshnikov ......... G06N 20/00
12,210,976 B2 * 1/2025 Liu ...................... G06V 10/751
2008/0097941 A1 * 4/2008 Agarwal ............... G06F 16/951 706/12
2017/0083829 A1 * 3/2017 Kang ..................... G06N 3/045
2017/0132528 A1 * 5/2017 Aslan ..................... G06N 20/00
2018/0158552 A1 * 6/2018 Liu ........................ G06N 3/044
2019/0325308 A1 * 10/2019 Chung .................. G06F 40/216
2020/0050846 A1 * 2/2020 Sharma .................. G06N 20/00
2020/0213587 A1 * 7/2020 Galpin ...................... G06N 3/08
2020/0244997 A1 * 7/2020 Galpin ................... H04N 19/82
2020/0285939 A1 * 9/2020 Baker .................... G06N 3/088
2020/0372406 A1 * 11/2020 Wick ..................... G06N 20/00
2021/0056390 A1 * 2/2021 Chen ...................... G06N 3/045
2021/0099710 A1 * 4/2021 Salehifar .............. G06N 3/0464
2021/0158204 A1 * 5/2021 Natesan Ramamurthy ................ G06N 20/00
2021/0374581 A1 * 12/2021 Wei ........................ G06N 20/00
2022/0101112 A1 * 3/2022 Brown ................. G06N 3/0895
2022/0114399 A1 * 4/2022 Castiglione ............ G06N 3/045
2022/0207875 A1 * 6/2022 Kopparapu ............ G06N 20/00
2022/0261593 A1 * 8/2022 Yu ......................... G06F 18/214
2022/0284283 A1 * 9/2022 Yin .......................... G06N 3/08
2022/0292724 A1 * 9/2022 Ren ........................ G06N 3/094
2022/0337852 A1 * 10/2022 Djelouah ............... G06N 3/045
2023/0023164 A1 * 1/2023 Parameswaran ....... G06N 3/045
2023/0048206 A1 * 2/2023 Athreya ............... G06V 40/161
2023/0091667 A1 * 3/2023 Rao ...................... G06N 3/0985 706/15
2023/0325469 A1 * 10/2023 Schiff ................. G06V 10/774

(Continued)

*Primary Examiner* — Tsion B Owens
(74) *Attorney, Agent, or Firm* — K&L Gates LLP

(57) ABSTRACT

Devices and techniques are generally described for privacy preserving fairness regularization for machine learning. In some examples, a first machine learning model may be trained for a first predictive task using unrestricted data. First data classified as restricted data may be determined. A second machine learning model may be trained to predict model fairness based at least in part on the first data and further based at least in part on second data representing characteristics of the first machine learning model during training. The second machine learning model may generate third data representing model fairness of a third machine learning model.

20 Claims, 5 Drawing Sheets

(56) References Cited

U.S. PATENT DOCUMENTS

| | | | | |
|---|---|---|---|---|
| 2024/0135238 A1* | 4/2024 | Sattigeri | .............. | G06N 3/0455 |
| 2024/0193481 A1* | 6/2024 | Bucklin | ................. | G06N 20/00 |

* cited by examiner

TRAINING MACHINE LEARNING MODELS USING PRIVACY PRESERVING FAIRNESS REGULARIZATION

BACKGROUND

In order to comply with various government regulations and best practices, stewards of data are required to maintain strict control over the usage, distribution, handling, and retention of personal data related to individuals. In various examples, this includes instituting capabilities to retrieve and present all personal data on demand, delete all personal data on demand, and adhere to complicated time- and rules-based retention and deletion schedules for personal data.

DETAILED DESCRIPTION

Figure 1A:
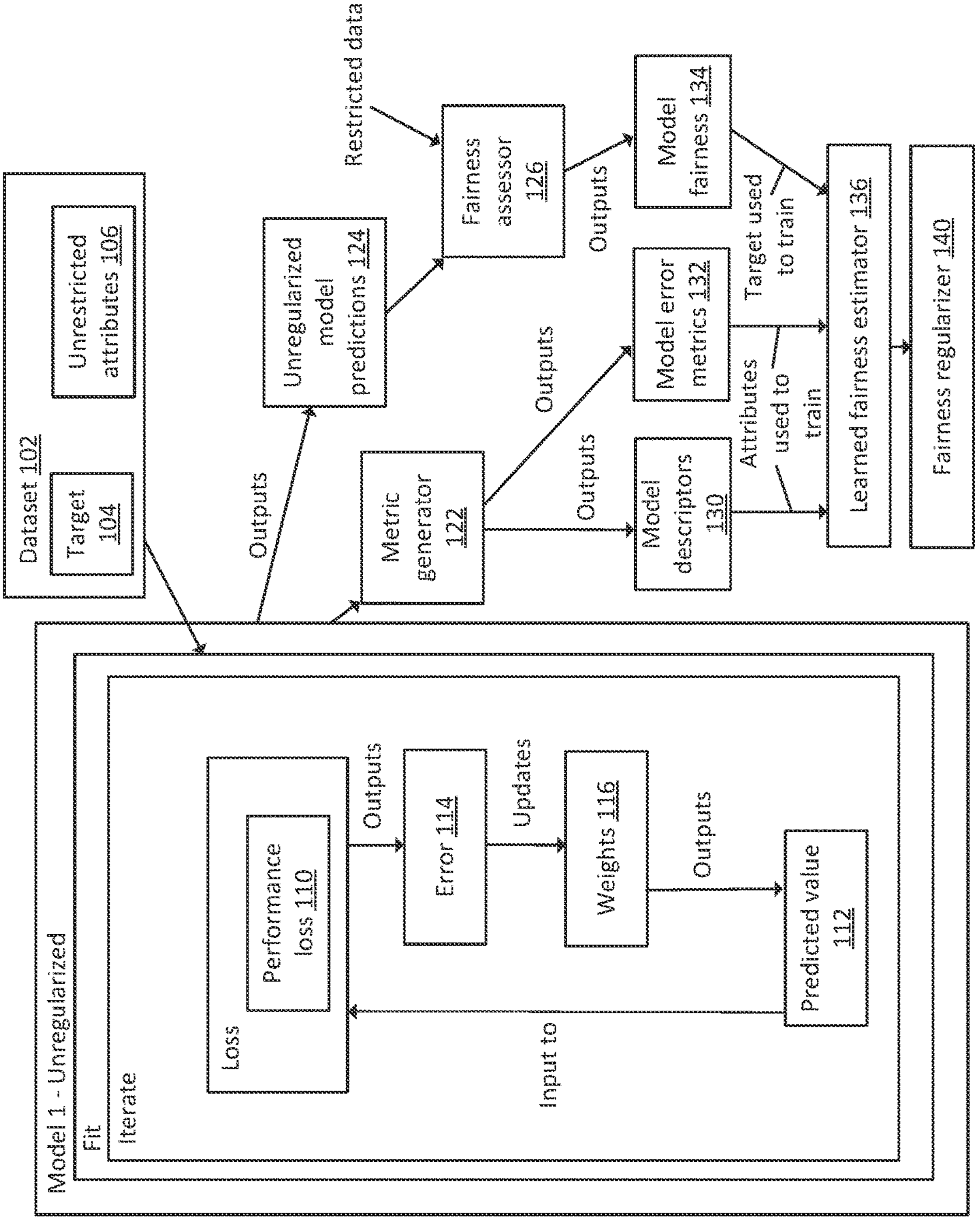
FIGS. 1A-1B are diagram illustrating an example system that may be used to train machine learning models using privacy preserving fairness regularization, in accordance with various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Storage and/or use of data related to a particular person or entity (e.g., personally identifiable information and/or other sensitive data) may be required to comply with regulations, privacy policies, and/or legal requirements of the relevant jurisdictions. In many cases, users may be provided with the option of opting out of storage and/or usage of personal data and/or may select particular types of personal data that may be stored while preventing aggregation and storage of other types of personal data. Additionally, aggregation, storage, and/or use of personal data may be compliant with privacy controls, even if not legally subject to them. For example, storage and/or use of personal data may be subject to acts and regulations, such as the Health Insurance Portability and Accountability Act (HIPAA), the General Data Protection Regulation (GDPR), and/or other data privacy frameworks.

Regularization, in machine learning, is a technique that attempts to prevent overfitting of a machine learning model to the training data by adding a penalty term to the loss function. This penalty term is often a function of the model's parameters and may encourage the model to have smaller parameter (e.g., weight) values, which in turn may reduce the complexity of the model and make the model less prone to overfitting to the training data.

Regularization can be applied to a wide range of machine learning models, including linear regression, logistic regression, neural networks, support vector machines, random forest models, etc. Regularization may improve the generalization performance of a machine learning model, particularly in cases where the amount of training data is limited and/or when the model has a large number of parameters.

If data representing the class membership of training data instances is known and available during training the fairness and/or bias of a particular machine learning model with respect to different classes can be directly measured. Regularization can then be used to improve the fairness of the models for classes that may be underrepresented in the training dataset. However, as previously described, in some instances restricted data such as class membership (or other sensitive data) may not be available during training for a variety of reasons and/or may be available and/or persisted only for certain periods of time. For example, it may be impermissible to store potentially sensitive data and/or users may have provided explicit instructions not to store or use their data. In some other examples, restricted data may be aggregated by a third party service and may not be directly accessible and/or may be accessible only via a time-consuming interface. Without access to such restricted data, it may not be possible to directly measure the fairness or bias of the model with respect to different classes of inputs.

Described herein are systems and techniques that may be used to regularize machine learning algorithms without real time access to data that is critical to regularization. In the context of improving the fairness of machine learning models across different classes, data representing class memberships (or other restricted data) may not be available at the time at which a machine learning model is being trained (for a variety of reasons). For example, described herein are systems and techniques that may be used to learn to approximate a regularization value during pre-training (e.g., when training on a dataset in which class membership data and/or other restricted data is available). Then, when training a machine learning model without any restricted data, the regularization value may be approximated according to the training characteristics of the model being trained (e.g., the error statistics and/or model weights), as described in further detail below.

Generally, as used herein, "restricted data" refers to data that can be used to directly calculate a regularizer term, but to which access is restricted for some reason. There may be a wide range of reasons that access to such data is restricted. For example, restricted data may include sensitive class membership data that is subject to legal and/or policy requirements surrounding storage of such information. In other cases, data may be restricted as it may be data belonging to a third party service that cannot directly be obtained. For example, a third party service may store class membership information for a dataset. While the third party service may not divulge the class membership information, the third party service may provide statistics (e.g., model fairness scores) across the training dataset based on the predictions for the individual training samples. In some other examples, restricted data may be restricted in the sense that access to such data may be impractical due to a time-consuming or cumbersome interface, rendering such data too slow to be used in some machine learning training tasks.

Machine learning techniques, such as those described herein, are often used to form predictions, solve problems, recognize objects in image data for classification, etc. For example, in the context of object detection/classification, a machine learning architecture may learn to analyze input images, detect various object classes (e.g., cats, dogs, etc.), and/or distinguish between instances of objects appearing in the images. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters (weights) control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Figure 1B:
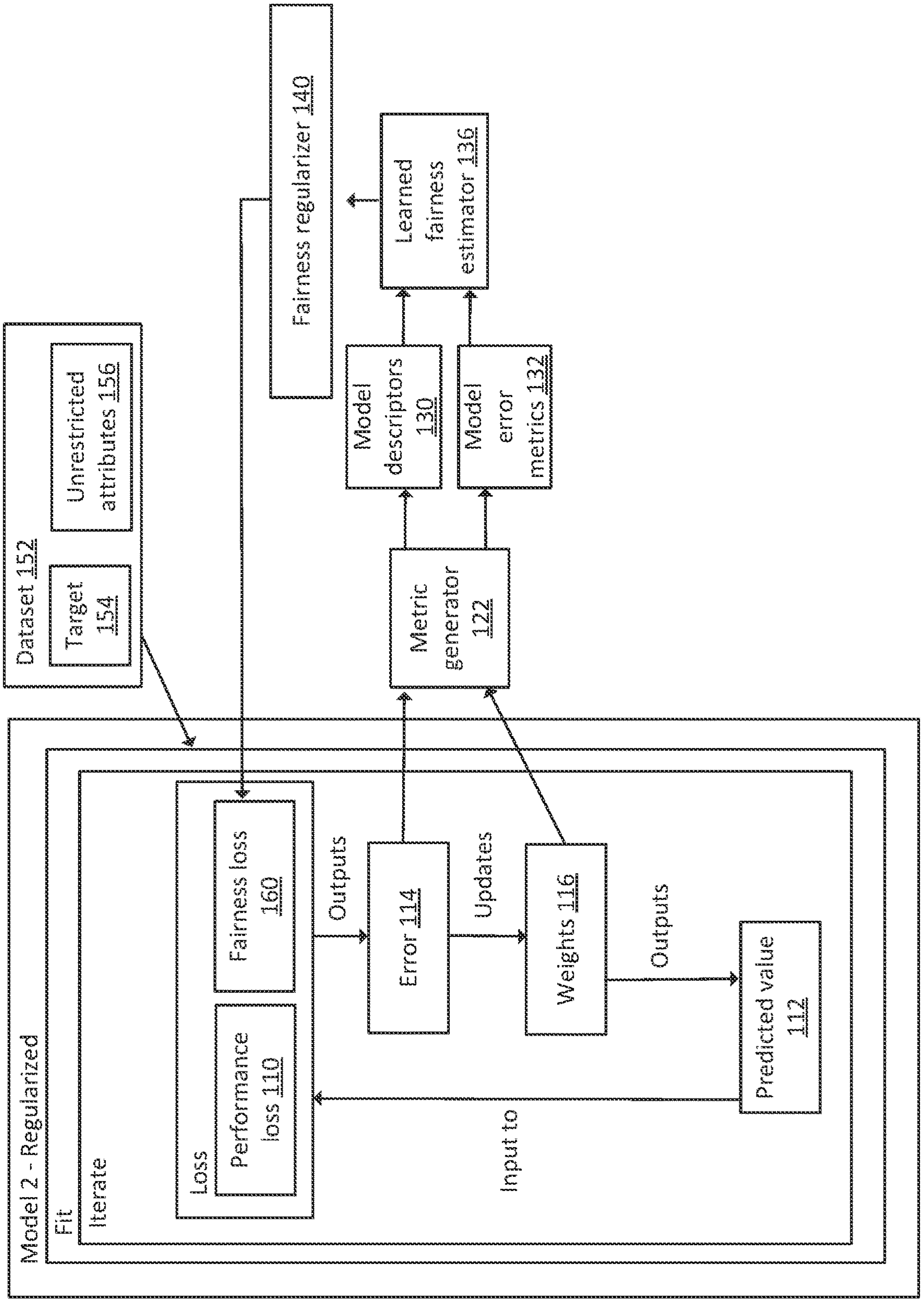

FIGS. 1A-1B are diagram illustrating an example system that may be used to regularize machine learning models during training even without real time access to data that is used to directly regularize the models. In some specific embodiments, a system that may be used to train machine learning models using privacy preserving fairness regularization is described, in accordance with various aspects of the present disclosure. FIG. 1A represents a pre-training stage during which a learned fairness estimator 136 is trained. The learned fairness estimator 136 may be a machine learning model that is trained to predict model fairness based on characteristics exhibited by the model during training. In the example in FIGS. 1A-1B, the characteristics of the model include model error metrics 132 (e.g., information about the prediction error determined during training of Model 1, such as variance, average error, etc.) and model descriptors 130 (e.g., the weights learned for Model 1 during training). It should be noted that the learned fairness estimator 136 may instead be trained using other characteristics and/or statistics of the model exhibited during training (e.g., features, loss data, etc.). Other examples of such characteristics, descriptors, and/or statistics may include, but are not limited to, weights, hyperparameters, root mean squared error (RSME), precision, recall, gain, concordance, discordance, entropy, $R^2$, features (e.g., permutation feature importance, Shapley Additive explanations (SHAP) values), mean, median, mode, variance, standard deviation, range, kurtosis, skewness, adjustments such as log, ln, etc. It should also be noted that while a single model is depicted as being trained in the example in FIG. 1A (Model 1), in practice a large number of models may be trained in order to generate the training data that is used to train the learned fairness estimator 136.

In general, the learned fairness estimator 136 is trained by training a plurality of other models for which restricted attribute training data is available. The error metrics determined (e.g., error data), the learned weights (e.g., weight data describing weights of the model), and the model fairness of these other models are determined, per-model during training. The learned fairness estimator 136 takes as input the model descriptors 130 and model error metrics 132 and predicts the target label model fairness (during training of the learned fairness estimator 136). Once trained, the learned fairness estimator 136 may predict model fairness for models for which sensitive attributes are not available in the training data. The predicted/estimated model fairness may be used in the loss function (as a regularizer term) during the training of such models to make such models more fair to different classes (even though class information and/or other sensitive data is not available during training).

Model 1 is trained using dataset 102. Dataset 102 includes unrestricted attributes 106 (e.g., data to which access is unrestricted and is readily available during training of Model 1) that may be data classified as unrestricted. After initialization of the parameters of Model 1, Model 1 makes a prediction (e.g., predicted value 112) on the basis of unrestricted attributes 106 (e.g., data classified as non-sensitive data). Additionally, in some examples, fairness assessor 126 may access data classified as restricted data (e.g., data indicating class membership of various different data points in dataset 102) in order to assess whether the predicted values (e.g., predicted value 112) are fair across different classes. In some examples, this sensitive data may be accessed using relatively time-consuming interfaces that may make obtaining and/or using this data impractical during time-sensitive model training procedures. For example, it may take minutes and/or hours to receive the restricted data, making training using such data impractical for training models that require frequent updates in order to maintain a high level of performance. In some cases, restricted data may not be directly accessible. For example, a third party service may determine model fairness across different groups/classes, but not directly report the class membership information to the fairness assessor 126. Accordingly, the restricted data (e.g., class/group membership of data points in dataset 102) may not be directly accessible during training of Model 1. However, fairness scores may be reported by the third party service for different groups/classes. Accordingly, the learned fairness estimator 136 may be trained on the basis of the restricted data (e.g., on the basis of different fairness scores for different groups/classes) even though access to such data is restricted.

The predicted value 112 may be compared to the target 104 (e.g., label data for each training instance in dataset 102) to determine error 114 (e.g., error data). The error 114 may be used to determine performance loss 110 (according to the particular loss function being used to train Model 1). Weights 116 may be updated to minimize the error (e.g., after calculating a negative gradient and using back propagation). This process may be repeated (iterated) any desired number of times. After training, Model 1 may be trained to generate unregularized model predictions 124 for newly-input data.

Metric generator 122 may include logic to generate desired metrics that describe characteristics of Model 1 during training of the learned fairness estimator 136 (which is trained after training Model 1 (FIG. 1A) and before training Model 2 (FIG. 1B). For example, average error and/or variance over all training iterations of Model 1 may be determined as model error metrics 132. In addition, a weight vector representing the learned weights of the model (and/or feature vectors representing attributes used by the model) may be determined (e.g., model descriptors 130).

The metric generator 122 provides a layer of abstraction between models (e.g., Models 1, 2) and the learned fairness estimator 136. The metric generator 122 receives the same super-set of model characteristics from Model 1 and Model 2, and, depending on the parameters it is given (e.g., which to prioritize, how to process), will output consistently formatted permutations of sets of those characteristics. With the metric generator 122, the learned fairness estimator 136 is not required to receive any information about Models 1, 2 (e.g. type of algorithm, predictive task) and the models are not required to receive any information about the learned fairness estimator 136 (e.g. how it works, what it is trained on). Model 2 (FIG. 1B) simply calls the learned fairness regularizer 140 when computing loss and provides the super-set of model characteristics from which the metric generator 122 can create the appropriate inputs for the learned fairness estimator 136. As described in further detail below, the learned fairness estimator 136 may predict the model fairness as fairness regularizer 140 (e.g., fairness regularizer data). The fairness regularizer 140 may be incorporated into the loss function as fairness loss 160 (e.g., a regularizer term in the loss function).

In addition, since the class membership data (e.g., restricted data obtained using a time-consuming interface) is obtained for the dataset 102 by fairness assessor 126, the fairness of the model (e.g., based on respective model performance for different classes of training data instances) may be directly observed. Fairness assessor 126 may include logic used to assess performance of Model 1 over different classes of training data instances. For example, it may be determined that for training data instances of Class A, Model 1 has 95% accuracy. However, for training data instances of Class B, Model 1 may have 71% accuracy. Accordingly, Model 1 may exhibit bias toward instances of Class B. In this example, class membership is determined using data classified as restricted data that may be accessed by fairness assessor 126 (e.g., using a time-consuming interface). Fairness assessor 126 may include logic to generate a model fairness 134, which may be a score (e.g., a value between 0 and 1 where values closer to 1 indicate a model that is more fair across different classes, while values closer to 0 indicate a model that is less fair across different classes).

Accordingly, after training Model 1, data representing model descriptors 130, model error metrics 132, and a model fairness 134 for Model 1 may be a training instance that is used to train the learned fairness estimator 136. The task of the learned fairness estimator 136 may be to predict model fairness scores based on input model weights and error metrics. A plurality of models may be trained in a similar way to the manner described above in reference to Model 1 in order to generate a sufficient amount of training data to train the learned fairness estimator 136. After training learned fairness estimator 136, the fairness of a new model may be assessed based on error metrics and model weights learned for the new model even though no restricted data may be available during training for the new model. The estimated fairness determined by the learned fairness estimator 136 may be used as a regularizer to improve the generalization of the new model. Accordingly, in the context of improving model fairness when access to restricted data is not available and/or is impractical to use, the learned fairness estimator 136 may be used to estimate a fairness regularizer 140 (e.g., predicted model fairness) that may be incorporated into the loss function during training of the new model to improve model fairness.

FIG. 1B is a block diagram that illustrates training of a new model after training the learned fairness estimator 136. In the example of FIG. 1B, Model 2 is trained with dataset 152, which may include unrestricted attributes 156 and a prediction target 154. The unrestricted attributes 156 may represent the same set of attributes as used in non-sensitive attributes 106 of dataset 102. After initialization of model weights, Model 2 may generate a predicted value 112 (e.g., based on input of data representing unrestricted attributes 156). The predicted value 112 may be compared to the target 154 to determine prediction error 114. The prediction error 114 may be used to determine performance loss (according to the particular loss function being used during training of Model 2). In addition, the error 114 and updated weights 116 for a given training iteration of Model 2 may be used (e.g., after computing the relevant error metrics using metric generator 122) as inputs into the learned fairness estimator 136. The learned fairness estimator 136 may predict the model fairness as fairness regularizer 140 (e.g., fairness regularizer data). The fairness regularizer 140 may be incorporated into the loss function as fairness loss 160 (e.g., a regularizer term in the loss function). The total loss for a given iteration of Model 2 training may thus be a combination of the performance loss 110 and the fairness loss 160. The total loss may be used to update the weights 116. Accordingly, the overall fairness of the model may be estimated and improved even though the training dataset 152 does not include any restricted data (such as class membership information).

Although the above examples describe a particular implementation in which the critical data needed for regularization is restricted data, it should be noted that the techniques described herein may be used to regularize machine learning algorithms in any context in which there is no (or limited) real time access to the data that is critical for regularization. For example, consider a case in which it is more important that a trained model be accurate to one group/class than another (e.g., high value targets). Sometimes, for a variety of reasons, group/class membership and/or other restricted data may not be available during training time, either because such data cannot be persisted in memory or because such data can only be accessed through an interface that either aggregates the data or is too slow to use during model training. The various techniques described herein may learn to predict model performance for the target group/class from the characteristics of the model and/or of the error across the individuals during model training. Then, the techniques described herein may use this estimate to correct the loss during training so that it better reflects the performance for the target group. Such techniques may have a wide range of applicability, from model fairness, to ad-targeting, to transfer learning from a general population to a specific audience, etc.

Figure 2:
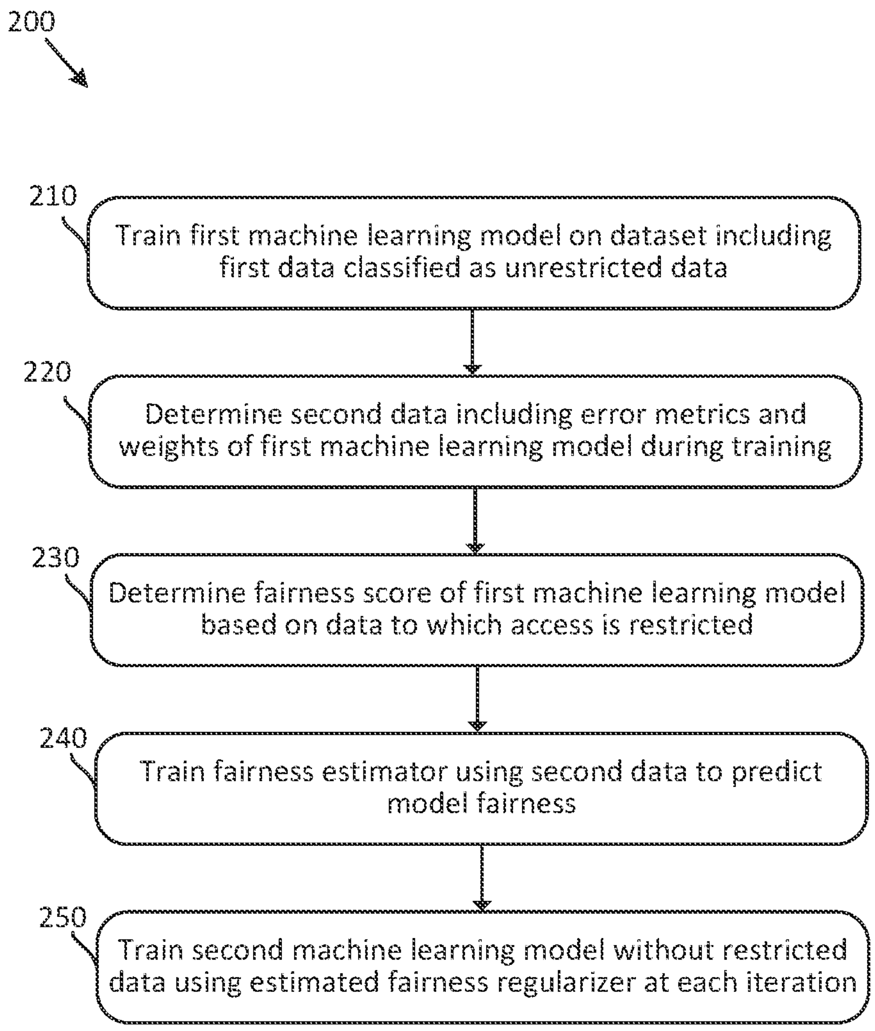
FIG. 2 illustrates an example process for privacy preserving fairness regularization, in accordance with various examples described herein.

FIG. 2 depicts an example process for privacy preserving fairness regularization, in accordance with various examples described herein. The actions of the process 200 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 200 may begin at action 210, at which a first machine learning model may be trained on a dataset including first data classified as unrestricted data. For example, the dataset may include various unrestricted attributes describing the data points (e.g., timestamps, dimensions, categories, etc.).

Processing may continue at action 220, at which second data that includes error metrics and weights of the first machine learning model may be determined during training of the first machine learning model. As described above, error and weights of the machine learning model may be determined during each training iteration. In various examples, error metrics and/or other metrics representing the model may be determined during training iterations (e.g., learned model weights, features, etc.) and/or after training is completed for the first machine learning model.

Processing may continue at action 230, at which a fairness score of the first machine learning model may be determined based on the first data. In various examples, restricted data may be obtained related to the data points of the dataset used to train the first machine learning model. For example, information about class membership of individual training instances of the dataset may be obtained, such that performance of the first machine learning model may be measured on a per-class basis. For example, the per-class performance of the first machine learning model may be determined by evaluating the performance of the first machine learning model for each different class of training data instance that the model has been exposed to during training. An overall fairness score of the model may be determined (using any desired technique and/or implementation, which may vary according to the desired fairness metric) for the first machine learning model. For example, an equalized odds difference among different classes of training data may be used to determine a fairness score.

Processing may continue at action 240, at which a fairness estimator (e.g., learned fairness estimator 136) may be trained using second data to predict model fairness. The second data may be, for example, a training data instance including the error metrics and the weights of a model determined during training (e.g., for the first machine learning model) with the target (e.g., label) of the training data instance being the fairness score for that model.

Processing may continue at action 250, at which a second machine learning model may be trained without use of restricted data using an estimated fairness regularizer at each iteration. For example, during training of the second machine learning model (e.g., Model 2 of FIG. 1B), the error statistics and weights determined at each iteration may be input into the learned fairness regularizer and an estimated fairness score may be output. The estimated fairness score may be incorporated into the loss function (by combining with the performance loss) as a regularizer term. In turn, the fairness regularizer may improve overall fairness of the model even without access to restricted data indicating class membership.

Figure 3:
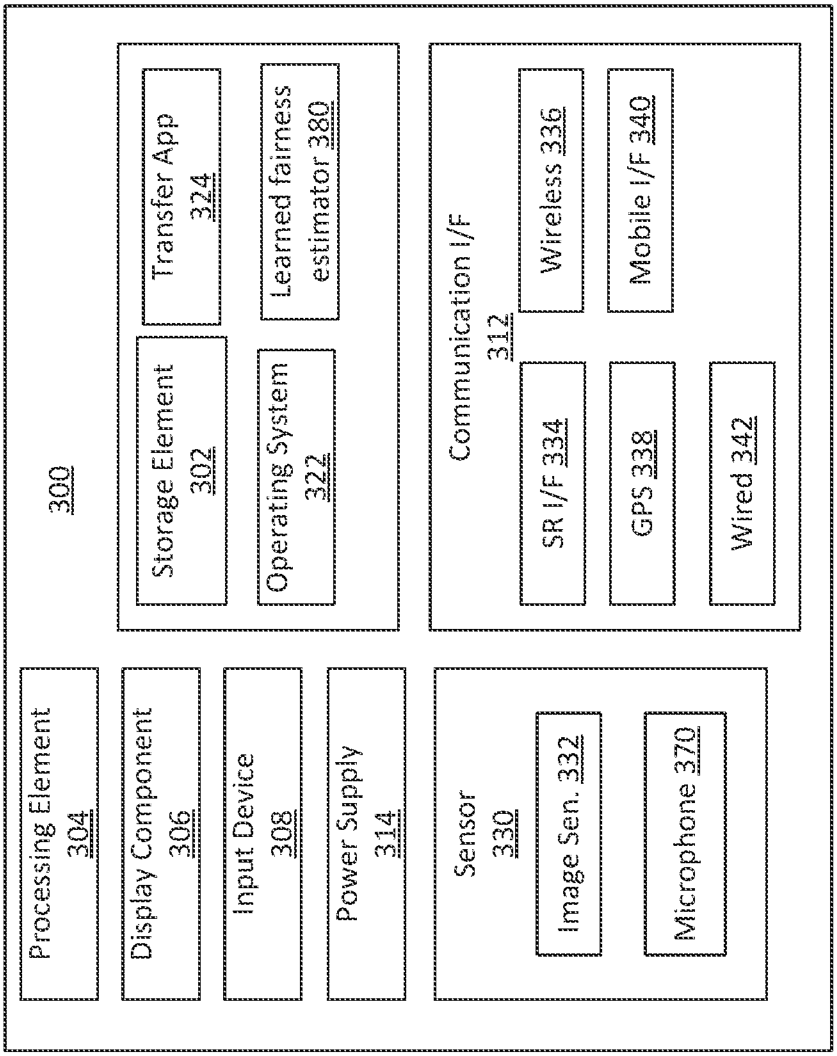
FIG. 3 is a block diagram showing an example architecture of a computing device that may be used in accordance with various embodiments described herein.

FIG. 3 is a block diagram showing an example architecture of a computing device that may be used in accordance with various embodiments described herein. It will be appreciated that not all devices will include all of the components of the architecture 300 and some user devices may include additional components not shown in the architecture 300. The architecture 300 may include one or more processing elements 304 for executing instructions and retrieving data stored in a storage element 302. The processing element 304 may comprise at least one processor. Any suitable processor or processors may be used. For example, the processing element 304 may comprise one or more digital signal processors (DSPs). In some examples, the processing element 304 may be effective to determine a wakeword and/or to stream audio data to a speech processing system. The storage element 302 can include one or more different types of memory, data storage, or computer-readable storage media devoted to different purposes within the architecture 300. For example, the storage element 302 may comprise flash memory, random-access memory, disk-based storage, etc. Different portions of the storage element 302, for example, may be used for program instructions for execution by the processing element 304, storage of images or other digital works, and/or a removable storage for transferring data to other devices, etc. In various examples, the storage element 302 may comprise instructions effective to program at least one processor to implement the dynamic privacy preserving data linkage in distrubted computing systems and/or the mapping authority as described herein.

The storage element 302 may also store software for execution by the processing element 304. An operating system 322 may provide the user with an interface for operating the computing device and may facilitate communications and commands between applications executing on the architecture 300 and various hardware thereof. A transfer application 324 may be configured to receive images, audio, and/or video from another device (e.g., a mobile device, image capture device, and/or display device) or from an image sensor 332 and/or microphone 370 included in the architecture 300. In some examples, the transfer application 324 may also be configured to send the received voice requests to one or more voice recognition servers. Architecture 300 may store parameters and/or computer-executable instructions effective to implement the learned fairness estimator 380 which may be used to estimate the fairness of a model being trained even absent availability of any restricted data indicating class membership.

When implemented in some user devices, the architecture 300 may also comprise a display component 306. The display component 306 may comprise one or more light-emitting diodes (LEDs) or other suitable display lamps. Also, in some examples, the display component 306 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 306 may be effective to display content determined provided by a skill executed by the processing element 304 and/or by another computing device.

The architecture 300 may also include one or more input devices 308 operable to receive inputs from a user. The input devices 308 can include, for example, a push button, touch pad, touch screen, wheel, joystick, keyboard, mouse, trackball, keypad, light gun, game controller, or any other such device or element whereby a user can provide inputs to the architecture 300. These input devices 308 may be incorporated into the architecture 300 or operably coupled to the architecture 300 via wired or wireless interface. In some examples, architecture 300 may include a microphone 370 or an array of microphones for capturing sounds, such as voice requests.

When the display component 306 includes a touch-sensitive display, the input devices 308 can include a touch sensor that operates in conjunction with the display component 306 to permit users to interact with the image displayed by the display component 306 using touch inputs (e.g., with a finger or stylus). The architecture 300 may also include a power supply 314, such as a wired alternating current (AC) converter, a rechargeable battery operable to be recharged through conventional plug-in approaches, or through other approaches such as capacitive or inductive charging.

The communication interface 312 may comprise one or more wired or wireless components operable to communicate with one or more other computing devices. For example, the communication interface 312 may comprise a wireless communication module 336 configured to communicate on a network, such as a computer communication network, according to any suitable wireless protocol, such as IEEE 802.11 or another suitable wireless local area network (WLAN) protocol. A short range interface 334 may be configured to communicate using one or more short range wireless protocols such as, for example, near field communications (NFC), Bluetooth, Bluetooth LE, etc. A mobile interface 340 may be configured to communicate utilizing a cellular or other mobile protocol. A Global Positioning System (GPS) interface 338 may be in communication with one or more earth-orbiting satellites or other suitable position-determining systems to identify a position of the architecture 300. A wired communication module 342 may be configured to communicate according to the USB protocol or any other suitable protocol.

The architecture 300 may also include one or more sensors 330 such as, for example, one or more position sensors, image sensors, and/or motion sensors. An image sensor 332 is shown in FIG. 3. An example of an image sensor 332 may be a camera configured to capture color information, image geometry information, and/or ambient light information.

Figure 4:
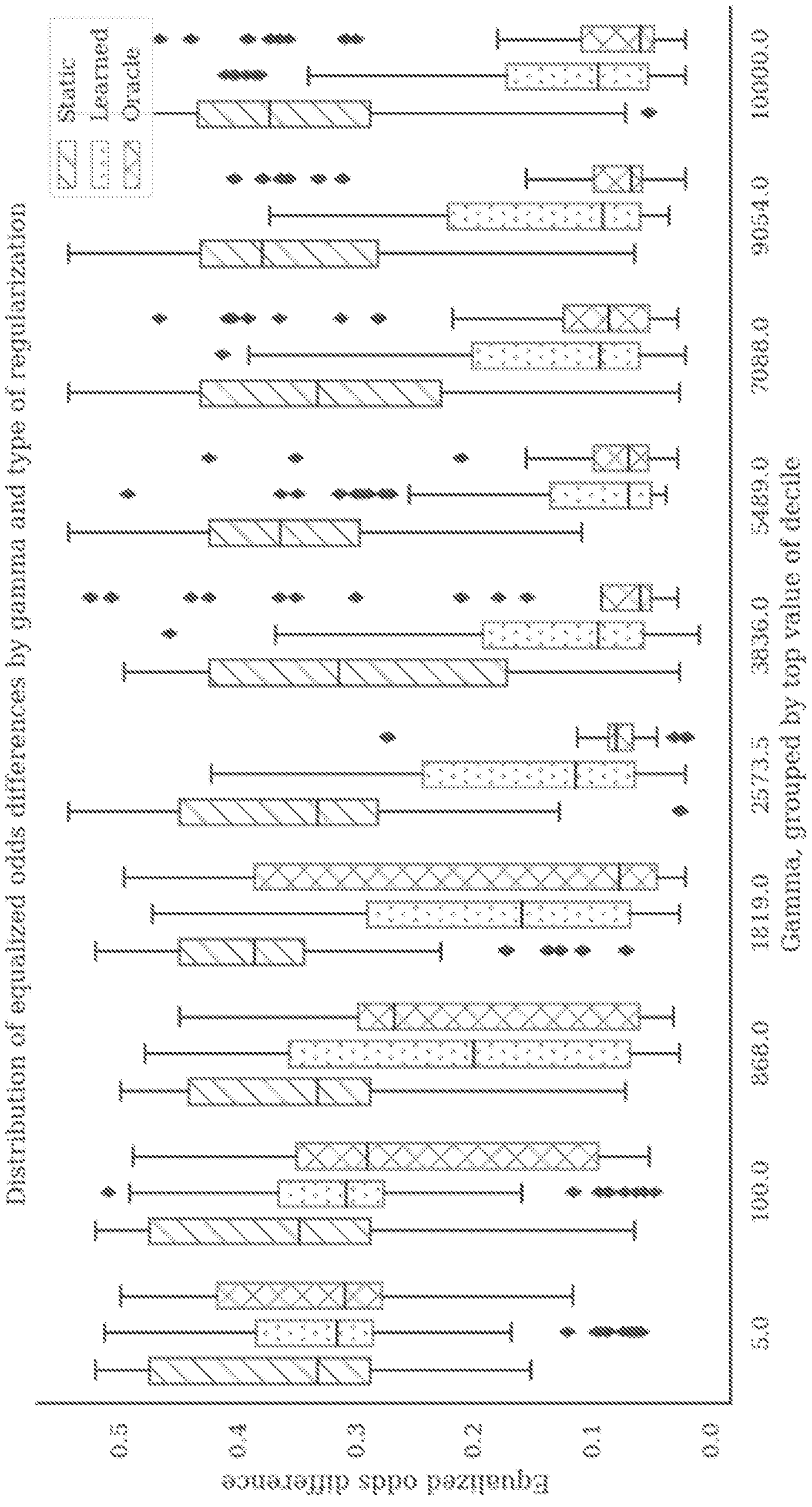
FIG. 4 depicts an example plot of model fairness against regularizer strength for three different regularization strategies, in accordance with various aspects of the present disclosure.

FIG. 4 depicts an example plot of model fairness against regularizer strength for three different regularization strategies, in accordance with various aspects of the present disclosure. The plot in FIG. 4 is a demonstration of performance on a synthetic variation of the UCI default dataset published as an example in the Fairlearn package (2020), wherein the task is a binary classification of whether an applicant will default on a loan. In the example of FIG. 4, equalized odds difference represents the fairness of the model (e.g., model performance across different classes of training data instances) with lower values representing more fair model performance. There are three different regularization strategies that are being compared in FIG. 4—static, learned, and oracle. Static represents machine learning without regularization (e.g., the loss function includes only performance loss without any regularizer term or with a static regularizer term). Oracle, by contrast, represents regularization when the regularizer is given access to the restricted data and thus can directly calculate fairness. The calculated fairness may be used as the ("oracle") regularizer term. The "Learned" regularizer represents the approach described herein, in which a learned fairness estimator (e.g., learned fairness estimator 136) is trained and is used to estimate model fairness absent any restricted data. Gamma is a parameter controlling the strength (magnitude) of the fairness regularization term. In some contexts, the Greek letter $\lambda$ may instead be used to represent the strength parameter. As Gamma is increased, the model becomes more fair, usually at the expense of model accuracy. As shown in FIG. 4, the improvement in terms of fairness from using the learned fairness estimator approach described herein is comparable to the improvement seen from using ground truth/oracle regularization, when compared to the static approach (with no regularization).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method comprising:
generating, by at least one processor, a first trained machine learning model by training a first machine learning model using a first dataset, wherein the first dataset comprises unrestricted data;
determining first data classified as restricted data, wherein the restricted data identifies different classes of data points of the first dataset;
determining second data comprising error statistics determined from the training of the first machine learning model;
determining third data describing weights of the first trained machine learning model;
determining fourth data representing a fairness score for the first trained machine learning model, wherein the fourth data is determined based on respective model performance for the different classes of the data points of the first dataset;
generating a first training instance comprising the second data, the third data, and the fourth data; and
generating a second trained machine learning model using the first training instance, wherein the second trained machine learning model is trained to predict model fairness scores from input data representing input error statistics and input model weights.

2. The computer-implemented method of claim 1, further comprising:
generating, during training of a second machine learning model, fifth data comprising error statistics determined during the training of the second machine learning model;
generating sixth data describing weights of the second machine learning model;
inputting the fifth data and the sixth data into the second trained machine learning model;
generating, by the second trained machine learning model based at least in part on the input of the fifth data and the sixth data, first fairness regularizer data; and
incorporating the first fairness regularizer data in a loss function during a subsequent iteration of the training of the second machine learning model.

3. The computer-implemented method of claim 2, wherein a second dataset used to train the second machine learning model comprises seventh data classified as unrestricted data.

4. A method comprising:
training, by at least one processor, a first machine learning model for a first predictive task, wherein the first machine learning model is trained using a first dataset comprising unrestricted data;
determining first data associated with the first dataset, wherein access to the first data is restricted;
training, by the at least one processor, a second machine learning model to predict model fairness, wherein the second machine learning model is trained based at least in part on the first data and on second data representing characteristics of the first machine learning model determined after training; and
generating, by the second machine learning model, third data representing the model fairness of a third machine learning model.

5. The method of claim 4, further comprising training, by the at least one processor, the third machine learning model using fourth data classified as unrestricted data.

6. The method of claim 4, further comprising:
determining first error data describing error during a first training iteration of the third machine learning model, wherein the third data representing the model fairness of the third machine learning model is generated based at least in part on the first error data.

7. The method of claim 4, further comprising:
determining first weight data describing weights determined during a first training iteration of the third machine learning model, wherein the third data representing the model fairness of the third machine learning model is generated based at least in part on the first weight data.

8. The method of claim 4, further comprising incorporating the third data into a loss function of the third machine learning model during training, wherein the third data represents a regularizer term of the loss function.

9. The method of claim 4, further comprising:
training the first machine learning model and the second machine learning model during a first time period at which access to the first data is available; and
training the third machine learning model during a second time period during which access to the first data is unavailable.

10. The method of claim 4, further comprising:
training, by the least one processor, the third machine learning model, by:
determining a first prediction for a first training data instance;
determining target data for the first training data instance;
determining error data representing a difference between the first prediction and the target data;
determining first performance loss using the error data;
determining first fairness loss using the third data; and
determining updated weights for the third machine learning model based at least in part on a combination of the first performance loss and the first fairness loss.

11. The method of claim 4, further comprising:
comparing the third data representing model fairness of the third machine learning model to fourth data representing model fairness of a fourth machine learning model; and
deploying the fourth machine learning model based on the comparing the third data to the fourth data.

12. The method of claim 4, wherein the second data representing characteristics of the first machine learning model during training comprise variance data representing variance of error determined for the first machine learning model during training.

13. A system comprising:
at least one processor; and
non-transitory computer-readable memory storing instructions that, when executed by the at least one processor, are effective to cause the at least one processor to:

train a first machine learning model for a first predictive task, wherein the first machine learning model is trained using a first dataset comprising unrestricted data;

determine first data associated with the first dataset, wherein access to the first data is restricted;

train a second machine learning model to predict model fairness, wherein the second machine learning model is trained based at least in part on the first data and further based at least in part on second data representing characteristics of the first machine learning model determined after training; and generate, by the second machine learning model, third data representing model fairness of a third machine learning model.

14. The system of claim 13, the non-transitory computer-readable memory storing further instructions that, when executed by the at least one processor, are further effective to cause the at least one processor to:

train the third machine learning model using fourth data classified as unrestricted data.

15. The system of claim 13, the non-transitory computer-readable memory storing further instructions that, when executed by the at least one processor, are further effective to cause the at least one processor to:

determine first error data describing error during a first training iteration of the third machine learning model, wherein the third data representing the model fairness of the third machine learning model is generated based at least in part on the first error data.

16. The system of claim 13, the non-transitory computer-readable memory storing further instructions that, when executed by the at least one processor, are further effective to cause the at least one processor to:

determine first weight data describing weights determined during a first training iteration of the third machine learning model, wherein the third data representing the model fairness of the third machine learning model is generated based at least in part on the first weight data.

17. The system of claim 13, the non-transitory computer-readable memory storing further instructions that, when executed by the at least one processor, are further effective to cause the at least one processor to:

incorporate the third data into a loss function of the third machine learning model during training, wherein the third data represents a regularizer term of the loss function.

18. The system of claim 13, the non-transitory computer-readable memory storing further instructions that, when executed by the at least one processor, are further effective to cause the at least one processor to:

train the first machine learning model and the second machine learning model during a first time period at which access to the first data is available; and train the third machine learning model during a second time period during which access to the first data is unavailable.

19. The system of claim 13, the non-transitory computer-readable memory storing further instructions that, when executed by the at least one processor, are further effective to cause the at least one processor to:

train the third machine learning model, by:

determining a first prediction for a first training data instance;

determining target data for the first training data instance;

determining error data representing a difference between the first prediction and the target data;

determining first performance loss using the error data;

determining first fairness loss using the third data; and determining updated weights for the third machine learning model based at least in part on a combination of the first performance loss and the first fairness loss.

20. The system of claim 13, wherein the second data representing characteristics of the first machine learning model during training comprise variance data representing variance of error determined for the first machine learning model during training.

* * * * *